(12) United States Patent
Patage et al.

(10) Patent No.: US 11,741,954 B2
(45) Date of Patent: Aug. 29, 2023

(54) METHOD AND VOICE ASSISTANCE APPARATUS FOR PROVIDING AN INTELLIGENCE RESPONSE

(71) Applicant: SAMSUNG ELECTRONICS CO., LTD., Suwon-si (KR)

(72) Inventors: Vinay Vasanth Patage, Bengaluru (IN); Sourabh Tiwari, Bengaluru (IN); Ravibhushan B. Tayshete, Bengaluru (IN)

(73) Assignee: SAMSUNG ELEOTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/173,878

(22) Filed: Feb. 11, 2021

(65) Prior Publication Data

US 2021/0249011 A1 Aug. 12, 2021

(30) Foreign Application Priority Data

Feb. 12, 2020 (IN) .............................. 202041006037

(51) Int. Cl.
| | | |
|---|---|---|
| G10L 15/22 | (2006.01) | |
| G10L 15/30 | (2013.01) | |
| G10L 21/0208 | (2013.01) | |
| G10L 15/08 | (2006.01) | |

(52) U.S. Cl.
CPC .............. *G10L 15/22* (2013.01); *G10L 15/08* (2013.01); *G10L 15/30* (2013.01); *G10L 21/0208* (2013.01); *G10L 2015/223* (2013.01); *G10L 2015/226* (2013.01)

(58) Field of Classification Search
CPC .... G10L 13/00–2013/105; G10L 15/22; G10L 15/08; G10L 15/30; G10L 21/0208; G10L 2015/223; G10L 2015/226; G10L 25/51; G10L 25/78; G06F 3/167
See application file for complete search history.

(56) References Cited

U.S. PATENT DOCUMENTS

| | | | |
|---|---|---|---|
| 6,334,103 B1 * | 12/2001 | Surace | H04M 3/4936 |
| | | | 704/E13.004 |
| 6,741,963 B1 | 5/2004 | Badt et al. | |
| (Continued) | | | |

FOREIGN PATENT DOCUMENTS

| | | |
|---|---|---|
| CN | 105355201 A | 2/2016 |
| CN | 108257596 A | 7/2018 |
| (Continued) | | |

OTHER PUBLICATIONS

International Search Report dated May 25, 2021 issued by the International Searching Authority in International Application No. PCT/KR2021/001848 (PCT/ISA/210).

*Primary Examiner* — Abul K Azad
(74) *Attorney, Agent, or Firm* — Sughrue Mion, PLLC

(57) ABSTRACT

Provided are a method and an apparatus for providing an intelligent voice response at a voice assistant device. The method includes obtaining, by a voice assistant device, a voice input from a user, identifying non-speech input while obtaining the voice input, determining a correlation between the voice input and the non-speech input, and generating, based on the correlation, a response comprising an action related to the correlation or a suggestion related to the correlation.

19 Claims, 10 Drawing Sheets

(56) References Cited

U.S. PATENT DOCUMENTS

| | | | |
|---|---|---|---|
| 7,212,969 B1 * | 5/2007 | Bennett | H04M 3/4936 |
| | | | 455/410 |
| 8,326,634 B2 | 12/2012 | Di Cristo et al. | |
| 9,002,835 B2 | 4/2015 | Sharifi | |
| 9,116,962 B1 | 8/2015 | Pance | |
| 9,786,279 B2 | 10/2017 | Sharifi et al. | |
| 10,380,208 B1 | 8/2019 | Brahmbhatt et al. | |
| 11,114,089 B2 * | 9/2021 | Chapman | G06F 21/32 |
| 2007/0050191 A1 * | 3/2007 | Weider | G10L 15/22 |
| | | | 704/E15.04 |
| 2015/0162000 A1 | 6/2015 | Di Censo et al. | |
| 2018/0233139 A1 * | 8/2018 | Finkelstein | G06V 40/166 |
| 2019/0385600 A1 | 12/2019 | Kim | |
| 2020/0074993 A1 | 3/2020 | Lee et al. | |
| 2021/0125610 A1 | 4/2021 | Cheung et al. | |

FOREIGN PATENT DOCUMENTS

| | | |
|---|---|---|
| JP | 3697177 B2 | 9/2005 |
| KR | 10-2005-0005604 A | 1/2005 |
| KR | 10-2011-0017559 A | 2/2011 |
| KR | 10-2018-0071931 A | 6/2018 |
| WO | 2019/172946 A1 | 9/2019 |

* cited by examiner

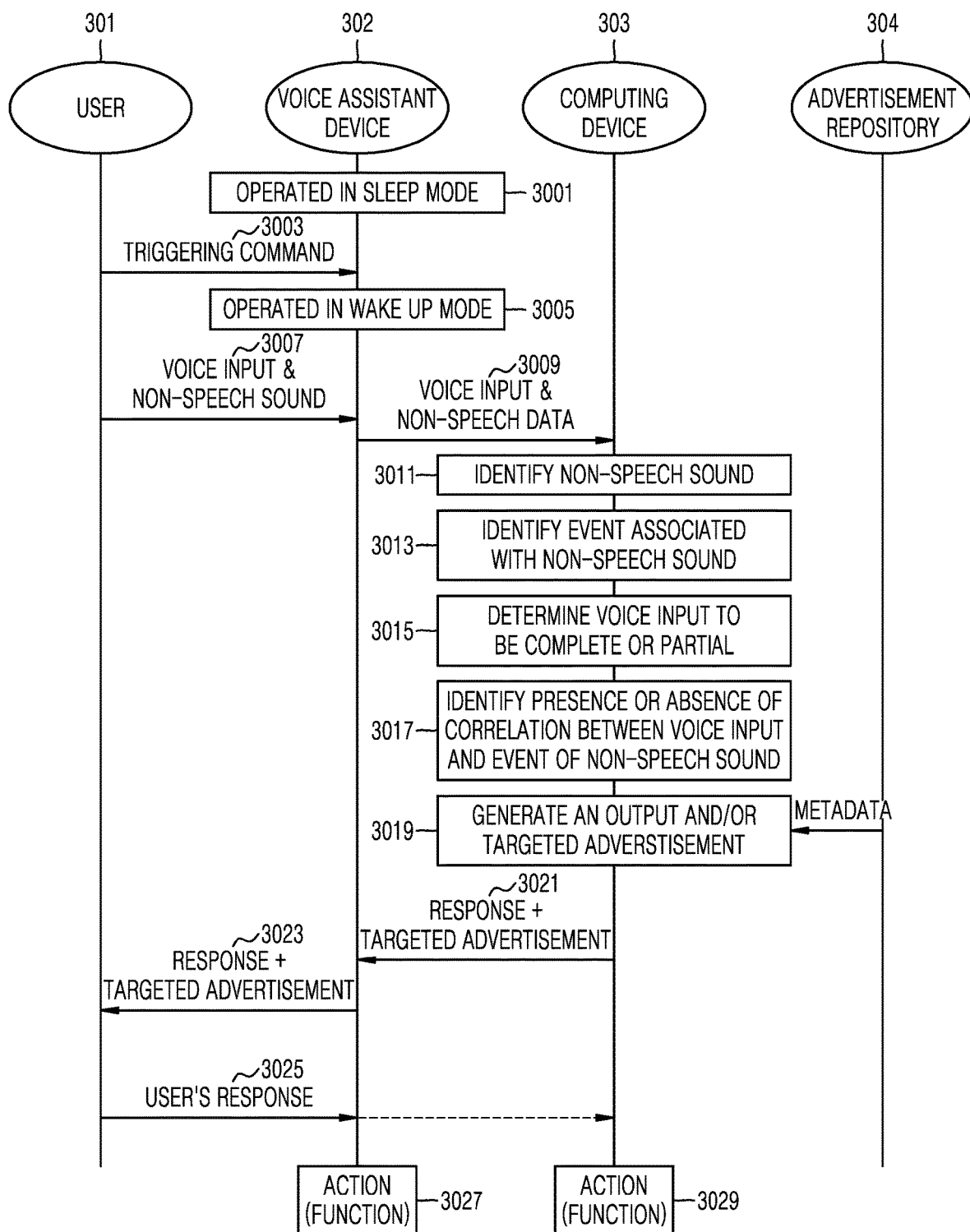

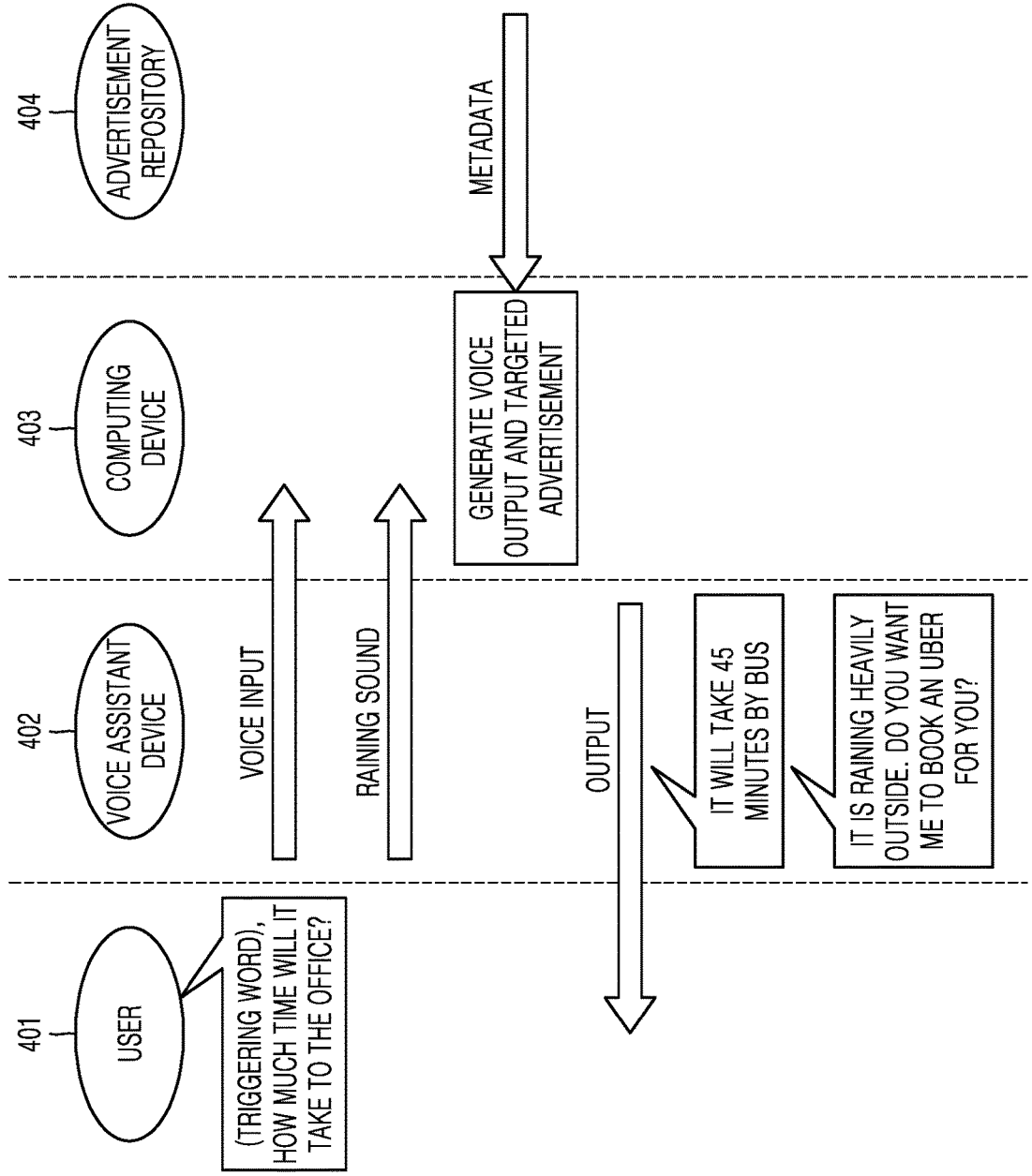

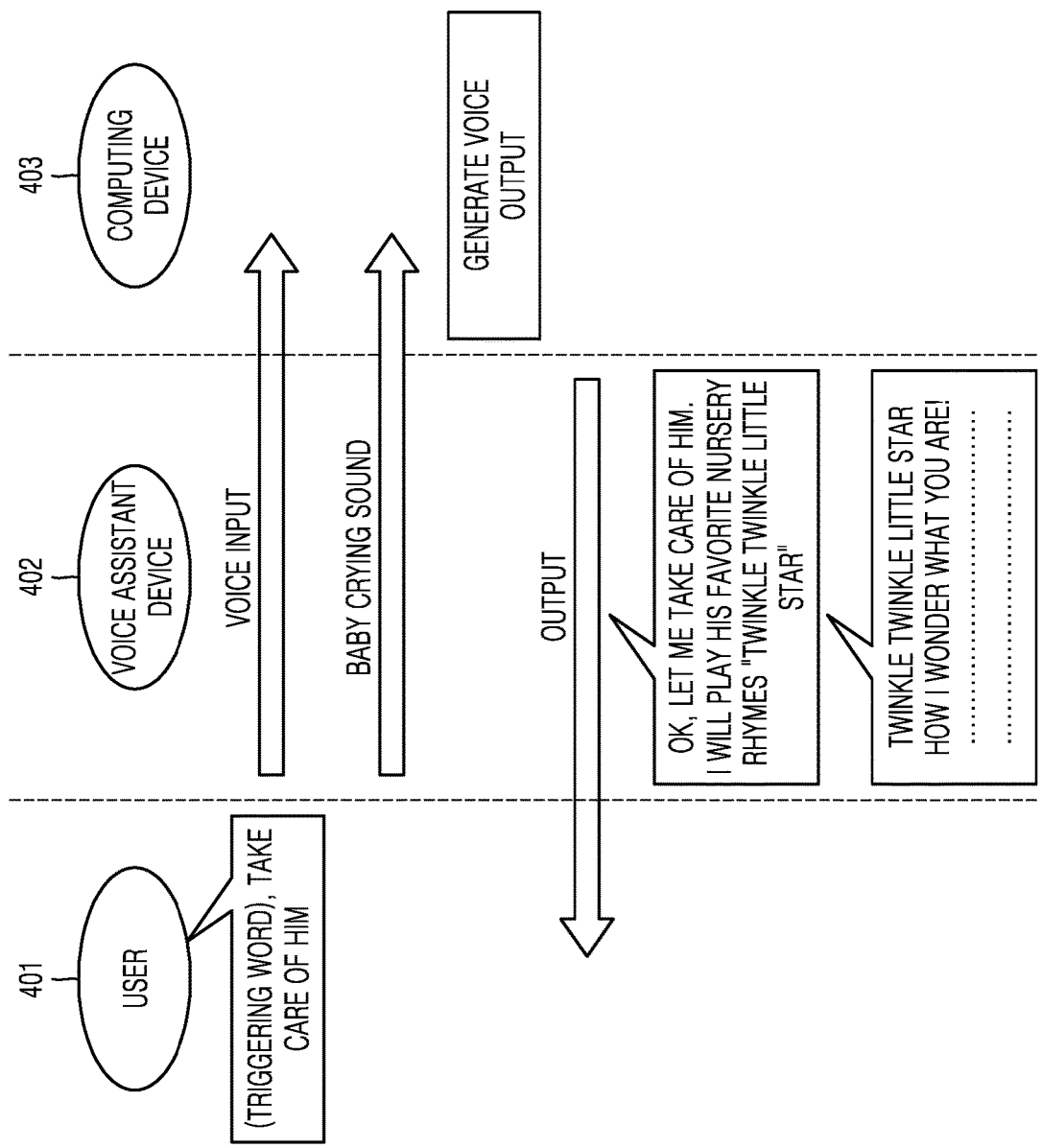

METHOD AND VOICE ASSISTANCE APPARATUS FOR PROVIDING AN INTELLIGENCE RESPONSE

CROSS-REFERENCE TO RELATED APPLICATION

This application is based on and claims priority under 35 U.S.C. § 119 from Indian Patent Application No. 202041006037, filed on Feb. 12, 2020, in the Indian Patent Office, the disclosure of which is incorporated by reference herein in its entirety.

BACKGROUND

1. Field

The present disclosure is related to a voice assistant method and device. More particularly, the disclosure relates to providing an intelligent response in response to an audio input and non-speech sound.

2. Description of Related Art

A voice assistant device is a digital assistant device that performs voice recognition, speech synthesis, and Natural Language Processing (NLP) to provide a service through a particular application. The voice assistant device is triggered to switch from a sleep mode to an active mode, using a triggering input (wake-up command or word) associated with the voice assistant device. A user may speak to the voice assistant device by initially making the triggering input, followed by a request. The request may be in a form of voice input. By providing the voice input, the voice assistant device may assist the user to perform various tasks such as booking cab, playing music, setting an alarm and so on. For any assigned task, the voice assistant device may respond to the user through a natural dialog generated via Natural Language Generation (NLG) system.

In a conventional voice assistant device, a response to a partial input or an incomplete query may not be generated, since the voice assistant device may not be configured to understand the intent of the partial input or the incomplete query. Usually, the response to the partial input or the incomplete query may be "SORRY, I DIDN'T UNDERSTAND THAT". Thus, the voice assistant device may not perform a task desired by the user and also, such response may make user uncomfortable. The conventional voice assistant device is not able to utilize user ambient data and user context to interpret a command for which actions can be provided for better user experience.

The information disclosed in this background of the disclosure section is only for enhancement of understanding of the general background and should not be taken as an acknowledgement or any form of suggestion that this information forms the prior art already known to a person skilled in the art.

SUMMARY

Embodiments address at least the above problems and/or disadvantages and other disadvantages not described above. Also, the embodiments are not required to overcome the disadvantages described above, and may not overcome any of the problems described above.

According to an aspect of the disclosure, a method of providing an intelligent voice response at a voice assistant device is provided. The method includes obtaining, by a voice assistant device, a voice input from a user, identifying non-speech input while obtaining the voice input, determining a correlation between the voice input and the non-speech input, and generating, based on the correlation, a response comprising an action related to the correlation or a suggestion related to the correlation.

According to another aspect of the disclosure, an apparatus for providing an intelligent voice response at a voice assistant device is provided. The apparatus includes a receiver which receives a voice input from a user; a processor which identifies non-speech input distinct from the voice input, determines a correlation between the voice input and the non-speech input, and generates, based on the correlation, a response comprising an action related to the correlation or a suggestion related to the correlation.

In an embodiment, the present disclosure relates to a method for providing enhanced response by a voice assistant device. Initially, a voice input provided by a user to a voice assistant device is received and at least one non-speech sound in vicinity of the user, while receiving the voice input from the user, is identified. Further, an event corresponding to the identified at least one non-speech sound is identified. A response to be provided to the user through the voice assistant device is generated based on correlation between the voice input and the identified event.

In an embodiment, the present disclosure relates to apparatus for providing enhanced response by a voice assistant device. The system includes a processor and a memory communicatively coupled to the processor. The memory stores processor-executable instructions, which on execution cause the processor to provide enhanced response by the voice assistant device. Initially, the apparatus is configured to receive a voice input provided by a user to a voice assistant device. Further, the apparatus is configured to identify at least one non-speech sound in vicinity of the user, while receiving the voice input from the user. Furthermore, the apparatus identifies an event, corresponding to the identified at least one non-speech sound. Finally, the apparatus generates a response to be provided to the user through the voice assistant device based on correlation between the voice input and the identified event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates a diagram for providing an intelligence response by the voice assistant device according to an embodiment of the disclosure;

FIG. 4A illustrates a flow diagram representing an exemplary scenario of outputting an intelligent response according to an embodiment of the disclosure;

FIG. 4C illustrates a flow diagram representing another exemplary scenario of outputting an intelligent response according to an embodiment of the disclosure;

Figure 1A:
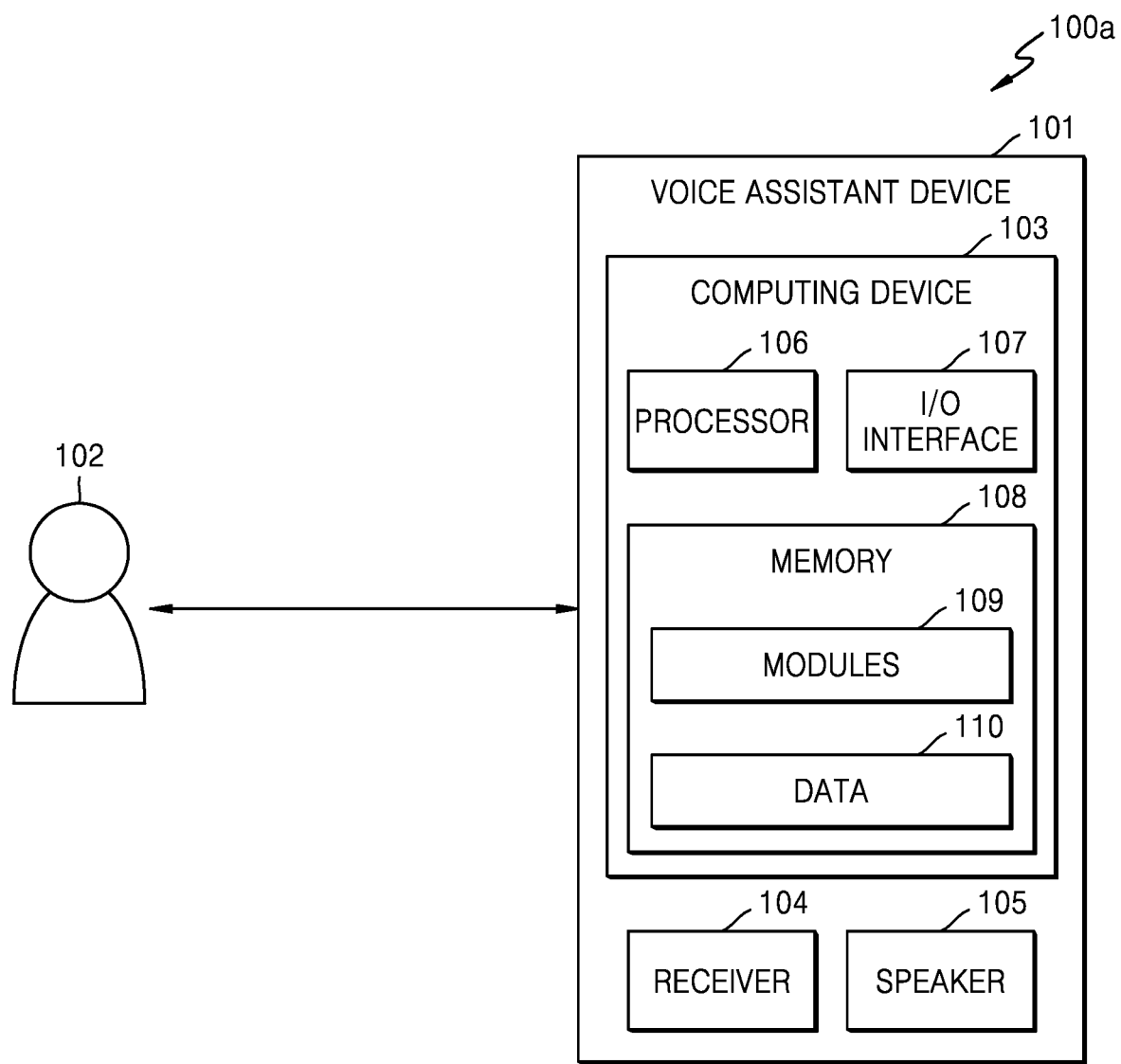
FIG. 1A illustrates an exemplary scenario between a user and a voice assistant device according to an embodiment of the disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

Various embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the embodiments can be practiced without those specifically defined matters. Also, well-known functions or constructions are not described in detail since they would obscure the description with unnecessary detail.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments of the present disclosure will be described below in detail with reference to the accompanying drawings.

When a voice input is received from the user, non-speech input such as non-speech sound of an environment in a vicinity of the user is also received and is identified by the voice assistant device to generate an enhanced and intelligent response for the user. The intelligent response is generated by determining correlation between the voice input and the non-speech sound which may correspond to a certain event. The intelligent response to the voice input may additionally include target advertisement related to the non-speech sound. The intelligent response may include an action related to the correlation or a suggestion related to the correlation.

FIG. 1A illustrates an exemplary scenario 100a between a user 102 and a voice assistant device 101 according to an embodiment of the disclosure. The voice assistant device 101 may perform voice recognition, speech synthesis, and Natural Language Processing (NLP) to provide an audio response service or an assistance to a user 102. The voice assistant device 101 may implement Artificial Intelligence (AI) to provide the service or the assistance to the user 102. The voice assistance device 101 may include a computing device 103.

The voice assistant device 101 may be triggered to initiate the service to the user 102. When the voice assistant device 101 is not in use, the voice assistant device 101 may be configured to be operated in a sleep-mode. When the voice assistant device 101 is in use, the voice assistant device 101 may be configured to wake up and be operated in an active mode. The voice assistant device 101 may switch from the sleep mode to the active mode when a triggering action or a triggering input is provided to the voice assistant device 101 by the user 102. In an embodiment, the triggering may be in form of a voice command from the user 102. In an embodiment, the trigger may be a particular word or an utterance associated with the voice assistant device 101. When the user 102 states the particular word for triggering, the voice assistant device 101 is initiated to receive and process voice inputs. Usually, the voice input is inputted by the user 102 to the voice assistant device 101. In an embodiment, the voice assistant device 101 may be registered with an account of the user 102. In an embodiment, the voice assistant device 101 may be embedded in a user device of the user 102. For example, the voice assistant device 101 may be embedded in a smart phone, a smart watch, a tablet, a personal digital assistant (PDA), laptops, of the user 102. In an embodiment, the voice assistant device 101 may be embedded in an infotainment system of a vehicle. In an embodiment, the voice assistant device 101 may be embedded in home appliances or equipment and may be configured to control the home appliances using voice commands of the user 102. The home appliances may include, but are not limited to, a refrigerator, a TV, a washing machine, a music player, an air conditioner, and so on. The voice assistant device 101 may be any device which receives voice inputs from the user 102 and provides service based on the voice inputs received from the user 102. In an embodiment, the service may be a voice output in response to the voice input and/or an action in response to the voice input. The action may include, but is not limited to, controlling devices connected to the voice assistant device 101, providing data to other devices, and/or outputting data or signals by the voice assistant device 101. In an embodiment, the voice assistant device 101 may connect to other devices or applications to provide service to the user 102. For example, if the voice assistant device 101 is embedded in a vehicle, the voice assistant device 101 may be connected with a music system, a navigation system, and/or a lighting system of the vehicle. In such cases, if the user 102 requests the voice assistant device 101 to navigate to a certain destination, the voice assistant device 101 may communicate with the navigation system to provide navigation service to the user 102. In case that the voice assistant device 101 is disposed in a home environment, the voice assistant device 101 may be connected with home appliances in the home environment and control operations of the home appliances. For example, if the user 102 requests to turn on an air conditioner (AC), the voice assistant device 101 may communicate with the AC to turn on the AC. In an embodiment, the voice assistant device 101 may be further configured to control temperature settings of the AC. In an embodiment, the voice assistant device 101 implemented in a user device, may be configured to control applications installed in the user device. For example, the voice assistant device 101 implemented in a smart phone of the user 102 may set an alarm, book a cab, check weather condition, book a cinema ticket, and so on based on voice inputs of the user 102. In an embodiment, the voice assistant device 101 may include a receiver 104 and a speaker 105. The receiver 104 may be configured to receive the voice input from the user 102. The speaker 105 may be configured to provide the voice output to the user 102.

The computing device 103 which is configured to provide an intelligence response by the voice assistant device 101 may include at least one processor 106, Input/Output (I/O) interface 107 and a memory 108. In some embodiments, the memory 108 may be communicatively coupled to the at least one processors 106. The memory 108 stores data, instructions executable by the at least one processor 106. The memory 108 may include one or more modules 109 and data 110. The one or more modules 109 may be configured to perform the steps of the present disclosure using the data 110, to control the output of the voice assistant device 101. In an embodiment, each of the one or more modules 109 may be a hardware unit which may be outside the memory 108. In an embodiment, the voice assistant device 101 may be a standalone device or may be embedded in a variety of computing systems, such as a laptop computer, a desktop computer, a Personal Computer (PC), a notebook, a smartphone, a tablet, e-book readers, a server, a network server, cloud server and the like.

The processor 106 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 106 may be disposed in communication with one or more input/output (I/O) devices via the I/O interface 107. The I/O interface 107 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 107, the computing device 103 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The processor 106 may be disposed in communication with a communication network via a network interface. The network interface may be the I/O interface 107. The network interface may connect to a communication network. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the voice assistant device 101 may communicate with the user 102. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

In an embodiment, the voice input may be received by the voice assistant device 101 when the voice assistant device 101 is operated in the active mode. The receiver 104 in the voice assistant device 101 may be configured to receive the voice input. In an embodiment, the processor 106 may determine whether the voice input from the user 102 is one of a partial input or a complete input. The voice input may be determined to be the partial input when the voice input is partial in nature. There may be missing parts in the partial input. The missing parts may be missing a person's reference, indication of task to be performed, indication of time when the task need to be performed and so on. For example, if the voice input is "take care of him," the voice input is partial since the voice input is missing identity of the specified person of whom a care should be taken. The voice input may be identified to be complete input when the voice input is complete without any missing parts. For example, the voice input of "take care of the baby" or "take care of John" may be identified to be a complete input. When the voice input is a partial input, complete contextual information from the voice input may not be determined. The voice input may be determined to be the complete input when the voice input is complete. When the voice input is the complete input, complete contextual information from the voice input may be determined.

The processor 106 may identify non-speech input including non-speech sound from the voice input, while receiving the voice input from the user 102. In an embodiment, the non-speech sound may be background environment noise present in the vicinity of the user 102. For example, the non-speech sound may be the sound of rain, background music to which the user may be listening, the sound of people's chat and so on. In an embodiment, the processor 106 may be configured to detect and/or identify non-speech sound while receiving the voice input. For each of the one or more non-speech sounds, the processor 106 may be configured to identify events, from a plurality of pre-defined events one of which may correspond to the non-speech sound. Further, the processor 106 may be configured to map the events with one or more Natural Language Processing (NLP) domains related to the voice assistant device 101 based on a profile of the user 102. By mapping, the at least one non-speech sound and the corresponding NLP domain capable of handling the at least one non-speech sound may be identified by the processor 106. In an embodiment, an event associated with the non-speech sound may indicate a type of the sound or category of the sound. The sound may be categorized based on characteristic of content in the sound. The non-speech sound may be categorized based on one of plurality of categories. Each category from the plurality of categories may provide context of the scenario in which non-speech signal occurring. The plurality of categories may include, but is not limited to, external sound category, human presence category, and domestic sound category and so on. Non-speech sound such as baby crying, kids playing, and people chit-chatting may be categorized to the human presence category. Non-speech sound such as surrounding music, a fire alarm, and appliance sound may be categorized to the internal/domestic sound category. Similarly, traffic sound may be associated with traffic noise event and may be categorized to the external sound category. Such categorization may be useful in correlating the voice input with the event associated with the non-speech sound. By identifying the event and categorizing the non-speech sound, an unbounded set of non-speech categorization classifier results may be reduced into a bounded set of actionable non-speech sound events. In an embodiment, the event may represent context of the non-speech sound. Examples of the pre-defined events associated with the non-speech sounds may include, but are not limited to, a raining event, a traffic noise, a shopping mall noise, a metro station noise, a movie theater noise, a baby crying event, a children playing event, a people chat event, music, a television noise, an alarm noise, and so on.

Non-speech sound is sound identified and distinguished from speech signal of the user included in the user's voice input. A trained classifier model may be implemented to extract or identify the non-speech sound from the voice input. The trained classifier model may be configured to perform feature extraction on the voice input to differentiate the speech signal from the non-speech sound in the voice input. Features extracted for identifying the non-speech sound, may include, but are not limited to, energy function, spectrum, cepstral coefficients, fundamental frequency, loudness, brightness, pitch, timbre, rhythm, and so on. At least one of the aforementioned features may be analyzed to identify the non-speech sound from the voice input. For example, part of voice signal with lower energy, lower loudness and higher frequency may be identified to be the non-speech sound. In an embodiment, a speech extraction techniques may be used on the voice input to differentiate the speech signal from non-speech sound. Upon extracting the speech signal, remaining sound from the voice input may be identified as the non-speech signal.

Upon identifying the non-speech sound, the processor 106 may identify an event, from the plurality of pre-defined events, associated with the non-speech sound. In an embodiment, the event corresponding to the non-speech sound may be determined based on the profile of the user 102. In an embodiment, the profile of the user 102 may include previous voice inputs and corresponding voice outputs associated with the user 102. The profile of the user 102 may include frequency and amplitude characteristics of the voice input of the user 102. Thus, if a voice input of one user is obtained, the processor 106 may analyze the voice input and compare the frequency and amplitude characteristics of the voice input with the stored frequency and amplitude characteristics in the profile of the user 102 for identification of the user 102. In an embodiment, the profile may also include preferences of the user 102, current location of the user 102 and so on. One or more other data associated with the user 102 may be stored in the profile of the user 102.

The processor 106 may generate, in response to the voice input of the user 102, an output to be provided to the user 102 through the voice assistant device 101. The output may be generated based on a correlation between the voice input and the event corresponding to the at least one non-speech sound or based on a correlation between the voice input and the non-speech sound corresponding to the event. In an embodiment, the correlation between the voice input and the event corresponding to the at least one non-speech sound may be determined by extracting one or more context parameters from the voice input. The extracted context parameters define context or an intent of the voice input. In an embodiment, the context parameters may include information of which application the voice input is related to. For example, the voice assistant device 101 may be associated with multiple applications and they may be a navigation application, a weather forecasting application, an online booking application, and so on. The context parameters may be extracted by analyzing the content of the voice input. For example, when the user input is "Book A Movie Ticket", the context parameters may be extracted to be online booking application. The one or more context parameters may be used to identify an NLP domain capable of handling the voice input. Further, the event is mapped to the NLP domain identified for the voice input, using a pre-defined correlation matrix. In an embodiment, the pre-defined correlation matrix indicates correlations between the plurality of pre-defined events related to plurality of non-speech sounds and one or more NLP domains related to the voice assistant device 101.

In an embodiment, when the voice input from the user 102 is one of a partial input or an incomplete input, the processor 106 may identify a presence of a correlation between the voice input and an event corresponding to the non-speech sound. The correlation may be determined between the voice input and the non-speech sound corresponding to the event. In response to the identification of the presence of the correlation, the processor 106 may generate an output response based on the correlation between the voice input and the identified event. In an embodiment, the voice assistant device 101 output may optionally include targeted advertisement content related to the non-speech sound. The targeted advertisement content may referred to as 'targeted advertisement' throughout the description. The targeted advertisement is a notification instructing the user to take certain actions or notifying information related to the voice input and/or non-speech sound.

In an embodiment, when the voice input from the user 102 is the complete input, the processor 106 may identify an absence of a correlation between the voice input and the event corresponding to the non-speech sound. In response to the identification of the absence of the correlation, the processor 106 may generate targeted advertisement content related to the non-speech sound along with an output response related to the voice input. In an embodiment, the targeted advertisement content may be generated based on the profile of the user 102 and metadata received from advertisement repository which is a database storing data related to the at least one non-speech sound. The advertisement repository may be implemented in the voice assistant device 101 or outside the voice assistant device 101.

The voice assistant device 101 may obtain the generated output response and the targeted advertisement. In an embodiment, the generated output response along with the targeted advertisement content may be provided to the user 102 using the speaker 105 of the voice assistant device 101.

In an embodiment, the computing device 103 may receive data for providing an intelligent response by the voice assistant device 101 via the I/O interface 107. The received data may include, but is not limited to, at least one of the voice input, the profile of the user 102, the metadata, and so on. Also, the computing device 103 may transmit data, for providing the intelligence response by the voice assistant device 101, via the I/O interface 107. The transmitted data may include, but is not limited to, the output response and/or the targeted advertisement content.

Figure 1B:
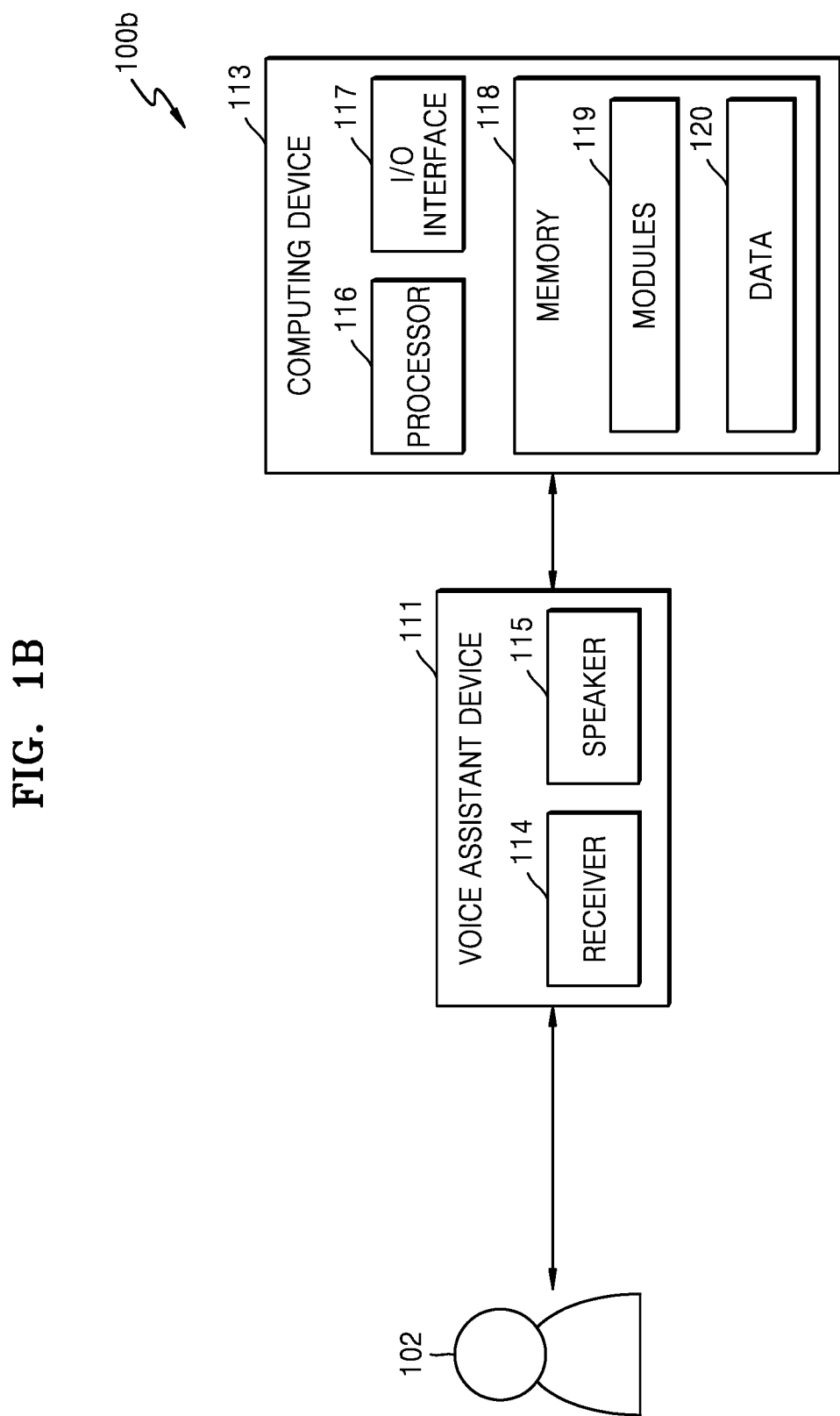
FIG. 1B illustrates an exemplary scenario between a user and a voice assistant device according to an embodiment of the disclosure.

FIG. 1B illustrates an exemplary scenario 100b between a user 102 and a voice assistant device 111 according to an embodiment of the disclosure. Referring to FIG. 1B, the voice assistant device 111 may be a standalone device and a computing device 113 may be implemented separately from the voice assistance device 111. The voice assistance device 111 may receive a voice input from the user 102 and the output an intelligent response received from the computing device 113. The computing device 113 may perform voice recognition, speech synthesis, and Natural Language Processing (NLP) to provide the intelligence response to the user 102 via the voice assistance device 113.

Figure 2:
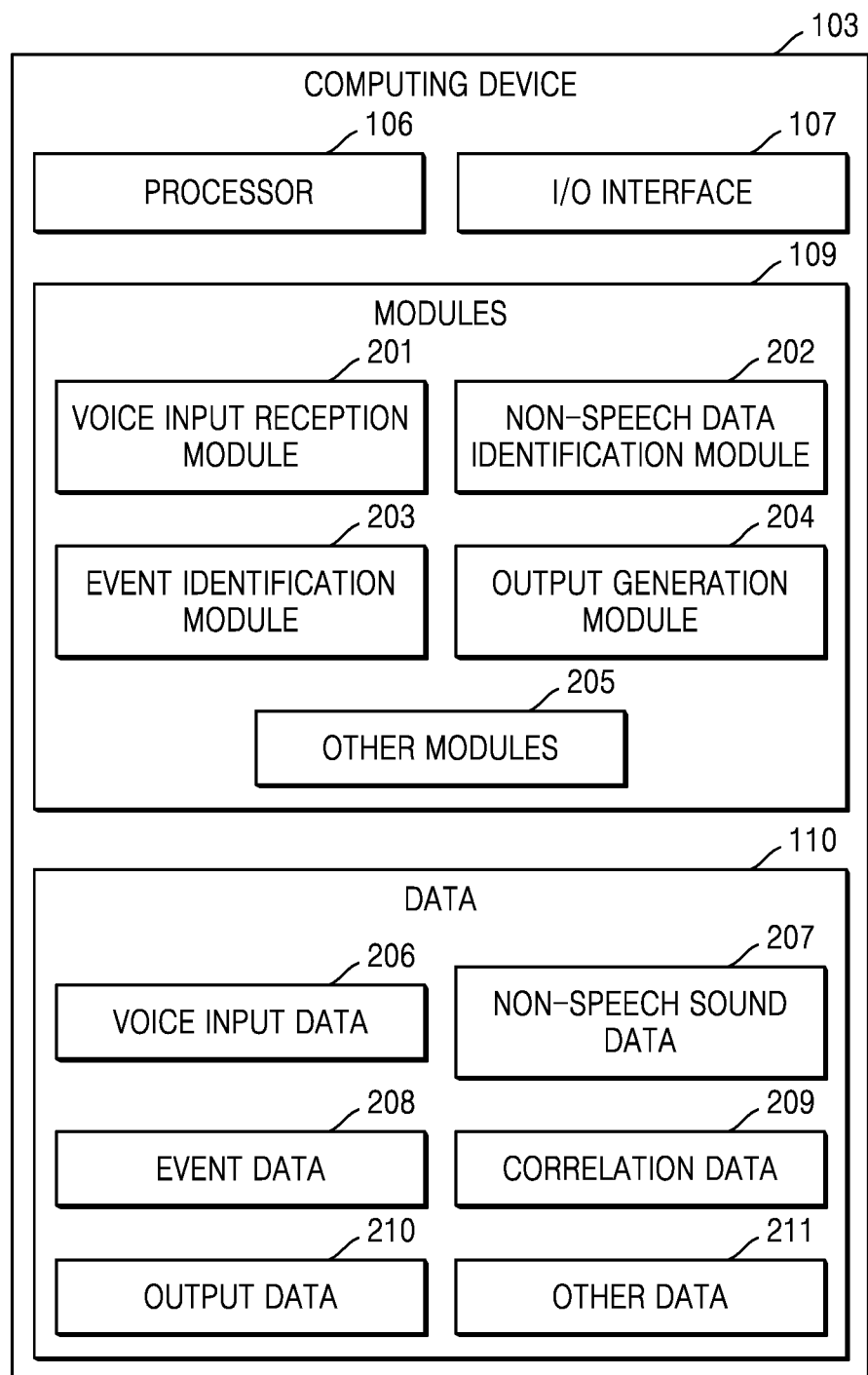
FIG. 2 illustrates a block diagram of the computing device for providing an intelligence response according to an embodiment of the disclosure.

FIG. 2 illustrates a block diagram of the computing device for providing an intelligence response according to an embodiment of the disclosure.

Referring to FIG. 2, the computing device 103 may correspond to the computing device 113 which is implemented separately from the voice assistant device 111.

The data 110 and the one or more modules 109 in the memory 108 of the computing device 103 is described in detail as below.

In an embodiment, the one or more modules 109 may include, but are not limited to, a voice input reception module 201, a non-speech data identification module 202, an event identification module 203, an output generation module 204 and one or more other modules 205, associated with the computing device 103.

In an embodiment, the data 110 in the memory 108 may include voice input data 206 (also referred to as voice input 206), non-speech sound data 207 (also referred to as non-speech sound or non-speech data 207) included in a non-speech sound input, event data 208, correlation data 209, output data 210, and other data 211 associated with the computing device 103.

In an embodiment, the data 110 in the memory 108 may be processed by the one or more modules 109 of the computing device 103. In an embodiment, the one or more modules 109 may be implemented as dedicated units and when implemented in such a manner, the modules may be configured with the functionality defined in the present disclosure. As used herein, the term "module" may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the corresponding functionality. In an embodiment, the one or modules 109 may be implemented as a hardware processor such as the processor 106.

The one or more modules 109 of the computing device 103 may control an intelligent output of the voice assistant device 101. The one or more modules 109 along with the data 110 may be implemented in any system, for controlling the voice assistant device 101. Working of the one or more modules is explained in conjunction with FIG. 3.

FIG. 3 illustrates a diagram for providing an intelligence response by the voice assistant device according to an embodiment of the disclosure.

In operation 3001, the voice assistant device 302 may be in a sleep mode. The user 301 may provide, to the voice assistant device 302, a triggering command for initiating an intelligent response service at the voice assistant device 302 in operation 3003. In an embodiment, the triggering command for initiating the intelligent response service be in form of a voice command, a text command, a visual command, for example hand gesture or via a signal sent using a remote controller. Upon receiving the triggering command for initiating the intelligent response service from the user 301, the voice assistant device 302 may operate in an active mode in operation 3005. While the voice assistant device 302 in the active mode, the user may provide a voice input in operation 3007.

The voice input reception module 201 of the computing device 303 may be configured to receive the voice input provided by the user 301 to the voice assistant device 302 in operation 3007. While receiving the voice input, the voice assistant device 302 may obtain non-speech sound in the vicinity of the user 301 as well. In other words, the input provided to the voice assistant device 302 may be a mixture of a voice input including the user's intent or the user's wish and non-speech sound occurring in the vicinity of the user 301. In an embodiment, the non-speech sound may be sound signal indicating background activity or background sound in the vicinity of the user 301. In an embodiment, the non-speech sound may be occurring while the user 301 is providing the voice input to the voice assistant device 302. In an embodiment, there may be one or more non-speech sound in the vicinity of the user 301. Each of the one or more non-speech sound may be received by the voice assistant device 302 and the voice input and the non-speech sound may be provided to the computing device 303 in operation 3009. In an embodiment, the computing device 303 may be embedded in or be separate from the voice assistant device 302.

In an embodiment, the received voice input 206 may be processed by Automatic Speech Recognition (ASR) engine implemented as the one or more other modules 205 in the computing device 303. The ASR engine may be configured to decode the voice input 206 and extract intent or context of the voice input 206 by voice recognition and sound analysis. In parallel, the non-speech data identification module 202 of the computing device 303 may identify at least one non-speech sound from the input in operation 3011. In an embodiment, the identified at least one non-speech sound may relate to an NLP domain of the voice assistant device 302. The NLP domain may be capable of handling the at least one non-speech sound. The voice assistant device 302 may be associated with one or more NLP domains for handling voice inputs received by the voice assistant device 302. The one or more NLP domains for the voice assistant device 302 may include, but are not limited to, navigation domain, weather domain, place of interest domain, booking domain, call domain, Internet Of Things (IoT) domain, music domain and so on. The NLP domains for the voice assistant device 302 may vary based on the implementation of the voice assistant device 302. For example, for a voice assistant device 302 implemented in an infotainment system, the NLP domain may include navigation domain, weather domain, music domain, call domain and so on. For a voice assistant device 302 implemented in a smart appliance, the NLP domains may include IoT domain, weather domain, music domain and so on.

If, for the received one or more non-speech sound, the non-speech sound is not related with any NLP domain of the voice assistant device 302, such non-speech sound may be considered for detecting appropriate targeted advertisement. If no target advertisements are possible, then the non-speech sound can be discarded by the non-speech data identification module 202. The received one or more non-speech sounds may be stored as the non-speech sound data 207 in the memory 108.

For identifying the at least one non-speech sound, the non-speech data identification module 202 may detect the one or more non-speech sound while receiving the voice input. In an embodiment, the non-speech data identification module 202 may implement a classifier which is trained with predefined non-speech data. The predefined non-speech data may be sound data from various devices, ambient sound from the user's surrounding, songs, background sounds, telecasted sounds and so on. The classifier may classify the voice input and the one or more non-speech sounds. In an embodiment, the non-speech data identification module 202 may apply sound processing technique to extract Log Mel features such as Mel-Frequency Cepstral Coefficients (MFCCs) from the voice input followed using Convolutional Neural Network (CNN) algorithm on the Log Mel features to detect the one or more non-speech sound.

The non-speech data identification module 202 may identify events corresponding to each of the one or more non-speech sound in operation 3013. The events may be selected from a plurality of pre-defined events. In an embodiment, the plurality of pre-defined events may include a list of events related to the non-speech sound. In an embodiment, the plurality of pre-defined events may be pre-defined and pre-stored in the memory 108 of the computing device 303 as the event data 208. Further, the non-speech data identification module 202 may map the events into one or more NLP domains related to the voice assistant device 302. The mapping may be performed based on the profile of the user 301 to identify the at least one non-speech sound and the corresponding NLP domain. In an embodiment, each of the events may be associated with at least one of NLP domains associated with the voice assistant device 302. For example, in case the event to be a raining event, the corresponding NLP domain may include at least one of navigation domain, weather domain, and so on. For example, in case the event is a baby crying event, the corresponding NLP domain may include at least one of music domain, Internet of Things (IoT) domain, and so on. In an embodiment, the profile of the user may be generated by the computing device 303 using one or more other modules 205. In an embodiment, previous voice inputs and previous voice outputs may be considered for generating the profile of the user 301. In an embodiment, a current location of the user (or the voice assistant device 302) and/or preferences of the user 301 may be used to generate the profile for the user 301. In an embodiment, the computing device 303 may be configured to dynamically generate the profile of the user 301, when providing an intelligent response by the voice assistant device 302. In an embodiment, the profile may be stored as other data 211 in the memory 108 of the computing device 303. In an embodiment, a deep learning module may be implemented to identify the at least one non-speech sound and the corresponding NLP domain capable of handling the at least one non-speech sound.

Upon identifying the at least one non-speech data, the event identification module 203 of the computing device 303 may identify an event associated with the at least one non-speech sound. In an embodiment, the event associated with the at least one non-speech data may be identified based on the profile of the user 301. In an embodiment, along with identifying the event associated with the at least one non-speech sound, the event identification module 203 may categorize the at least one non-speech sound based on the identified event. The at least one non-speech sound may be categorized based on one of plurality of categories. The plurality of categories may include, but is not limited to, external sound category, human presence category, and domestic sound category and so on. Non-speech sounds such as baby crying, kids playing, and people chit-chatting may be categorized to the human presence category. Non-speech sounds such as surrounding music, a fire alarm, and appliance sound may be categorized to be the internal/domestic sound category. Similarly, traffic sound may be associated with traffic noise event and may be categorized to the external sound category. Such categorization may be useful in correlating the voice input with the event associated with the at least one non-speech sound. By identifying the event and categorizing the at least one non-speech sound, an unbounded set of non-speech categorization classifier results may be reduced into a bounded set of actionable non-speech sound events.

The output generation module 204 of the computing device 303 may generate a response which is to be provided to the user 301 through the voice assistant device 302. The response may be generated based on a correlation determined between the voice input and the at least one non-speech sound. The at least one non-speech sound may be associated with at least one event. The correlation may be performed using a deep learning model which is trained using the pre-defined correlation matrix. In an embodiment, the output generation module 204 may determine the correlation between the voice input and the event corresponding to the at least one non-speech sound. The determination of the correlation may be performed by extracting one or more context parameters from the voice input. The one or more context parameters may be used to identify an NLP domain capable of handling the voice input. Further, the output generation module 204 may map the event with the NLP domain identified for the voice input using the pre-defined correlation matrix, to perform the correlation. In an embodiment, the pre-defined correlation matrix represents the correlation between the plurality of pre-defined events related to a plurality of non-speech sound and one or more NLP domains related to the voice assistant device 302. In an embodiment, the output of the correlation and the pre-defined correlation matrix may be stored as the correlation data 209 in the memory 108. In an embodiment, the correlation matrix may be in a form of a look-up table including predefined categories, predefined events and NLP domains. The example of the pre-defined correlation matrix may be as shown in Table 1 below:

TABLE 1

| Category | Event | NLP domains |
| --- | --- | --- |
| External sound category | Raining | Navigation, weather, place of interest |
| | Traffic noise | |
| | Shopping mall | Navigation, place of interest, booking |
| | Metro station | |
| | Movie theatre | |

TABLE 1-continued

| Category | Event | NLP domains |
| --- | --- | --- |
| Human presence | Baby crying | Music, call, IoT |
| | Kid playing | |
| | People chit chatting atmosphere in room (Party, Tense) | Music, food order, chat-bot, IoT, telecast |
| Domestic sound | Music | Music, IoT |
| | TV | |
| | Fire alarm | |
| | Appliance sound (wash machine) | |

In an embodiment, for generating the response, the one or more modules 109 of the computing device 303 may determine whether the voice input is a partial input or a complete input. When the voice input from the user 301 is the partial input or the complete input, the output generation module 204 may identify a presence of the correlation between the voice input and the identified event in operation 3017. In response to the identification of the presence of the correlation, the output generation module 204 may generate the response based on the correlation between the voice input and the identified event in operation 3019. In an embodiment, the response may optionally include the targeted advertisement content related to the at least one non-speech sound.

In an embodiment, for generating the response, when the voice input from the user 301 is the complete input, the output generation module 204 may determine an absence of the correlation between the voice input and the identified event. In response to the identification, the output generation module 204 may generate the targeted advertisement content related to the at least one non-speech sound along with the response related to the voice input. In an embodiment, the targeted advertisement content may be generated based on the profile of the user 301 and metadata obtained from the advertisement repository for the at least one non-speech sound. In an embodiment, the output generation module 204 may query the advertisement repository, based on the output of the correlation. Based on the output of the correlation and the at least one non-speech sound, the advertisement repository may provide the metadata to the output generation module 204. The metadata from the advertisement repository may include information related to the advertisements that may be provided to the user. The information, may include, but is not limited to, information on advertising agents, information on entities to be advertised to the user, a form of advertisement to be provided to the user and so on. One or more other information related to the advertisement provided to the user may be stored as the metadata in the advertisement repository. Using the metadata, the target advertisement may be generated and provided to the voice assistant device 302. In an embodiment, the response and/or the targeted advertisement content generated for the voice input and the at least one non-speech sound may be stored as the output data 210 in the memory 108 and may be transmitted to the voice assistant device 302 in operation 3021. The response and/or the targeted advertisement content may be output to the user 301 in operation 3023.

In an embodiment, the response and/or the targeted advertisement content may recommend and require the user 301 to take certain actions. In response to the recommendation, the user 301 may take the designated or recommended actions as the user's response in operation 3025. The voice assistant device 302 may perform a corresponding function in response to the user's response in operation 3027. Alternatively, the computing device 303 may perform the corresponding functions instead in operation 3029 if the voice assistant device 302 is not able to perform or inappropriate to perform the corresponding function. In an embodiment, the computing device 303 may be embedded in the voice assistant device 302.

FIG. 4A illustrates a flow diagram representing an exemplary scenario of outputting an intelligent response according to an embodiment of the disclosure.

Referring to FIG. 4A, a user 401 provides a voice input of "(TRIGGERING WORD), HOW MUCH TIME WILL IT TAKE TO THE OFFICE" to the voice assistant device 402. The "TRIGGERING WORD" may be, for example, "Hi, (a name designated to the voice assistant device 204)!" The voice input is received by a voice assistant device 402 and transmitted to a computing device 403. While receiving the voice input, the voice assistant device 402 may identify non-speech sound to be raining sound. Along with the voice input, the raining sound is also transmitted to the apparatus 403. To determine a correlation, the computing device 403 may identify a presence of the correlation between the received voice input and the raining sound. The presence of correlation may be identified by using the predefined correlation matrix. The NLP domain for the voice input 206 may be mapped to the navigation domain. Also, the raining event is associated with the navigation domain based on the raining sound. Hence, the presence of the correlation between the voice input and the non-speech sound of the raining sound may be determined. Since the voice input is a complete input and the presence of correlation is identified, the computing device 403 may generate a response considering the raining condition. In an embodiment, the computing device 403 may estimate an extended time to the office compared to a normal weather condition based on the raining condition. Thus, if it takes 25 minutes to the office by bus in a normal weather condition, the computing device 403 may determine the estimated time of 45 minutes to the office in the raining weather condition and provide to the user 401 a voice output of "IT WILL TAKE 45 MINUTES BY BUS." In addition, the computing device 403 may recognize the extended time to the office and thus may take into account an alternative and fast transportation such as UBER CAB service to shorten the time to the office. Thus, the computing device 403 may generate targeted advertisement content using metadata received from the advertisement repository 404. For the given scenario, the computing device 403 may generate the targeted advertisement content which may be "IT IS RAINING HEAVILY OUTSIDE. DO YOU WANT ME TO BOOK AN UBER FOR YOU?".

Figure 4B:
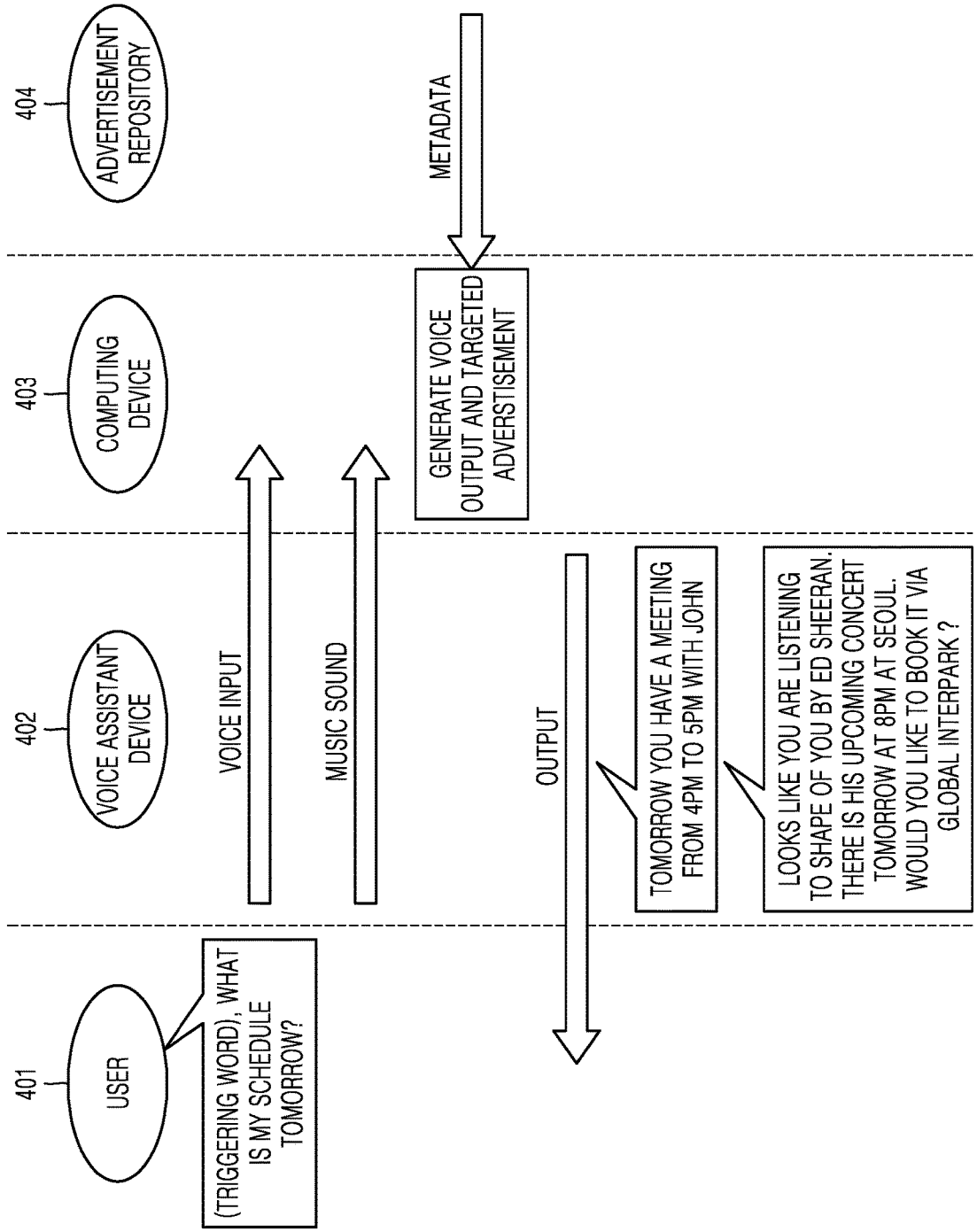
FIG. 4B illustrates a flow diagram representing another exemplary scenario of outputting an intelligent response according to an embodiment of the disclosure.

FIG. 4B illustrates a flow diagram representing another exemplary scenario of outputting an intelligent response according to an embodiment of the disclosure.

Referring to FIG. 4B, the user 401 provides a voice input of "(TRIGGERING WORD), WHAT IS MY SCHEDULE TOMORROW" to the voice assistant device 402. The voice input is obtained by the voice assistant device 402 and transmitted to the computing device 403. While obtaining the voice input, the voice assistant device 402 may also obtain and identify the non-speech sound which is music sound. Along with the voice input, the music sound is also transmitted to the computing device 403. The computing device 403 may determine whether the received voice input is a complete input. To determine a correlation, the computing device 403 may identify an absence of the correlation between the received voice input and the music sound. The absence of the correlation may be identified using the predefined correlation matrix. NLP domain for the voice input may correspond to the calendar domain. Whereas the music event is not associated with the calendar domain. Hence, the absence of the correlation is determined for the received voice input and the non-speech sound of the music sound. Since the voice input is complete and the absence of correlation is determined, the computing device 403 may generate the response and the targeted advertisement using metadata received from the advertisement repository 404. For the given scenario, the computing device 403 may generate a response of "TOMORROW YOU HAVE A MEETING FROM 4 PM TO 5 PM WITH JOHN" referring to a calendar application. In addition, based on the music sound, the computing device 403 may generate targeted advertisement content as well. The computing device 403 may analyze the music sound and identify a title of the music sound. Based on the identification of the title of the music sound, the computing device 403 may collect any data relevant to the title of the music sound such as a singer of the title, and upcoming event related to the singer, any chart related to the title, recent state of the singer, any TV show related to the singer, etc. The computing device 403 may recommend to the user 401, an application associated with the collected data relevant to the title of the music. The computing device 403 may, based on information related to an upcoming event associated with the singer of the music sound, generate the targeted advertisement content which is, for example, "LOOKS LIKE YOU ARE LISTENING TO 'SHAPE OF YOU' BY ED SHEERAN. THERE IS HIS UPCOMING CONCERT TOMORROW AT 8 PM AT SEOUL. WOULD YOU LIKE TO BOOK IT VIA GLOBAL INTERPARK?".

FIG. 4C illustrates a flow diagram representing another exemplary scenario of outputting an intelligent response according to an embodiment of the disclosure.

Referring to FIG. 4C, the user 401 provides a voice input of "(TRIGGERING WORD), TAKE CARE OF HIM" to the voice assistant device 402. The voice input is obtained by the voice assistant device 402 and transmitted to the computing device 403. While obtaining the voice input, the voice assistant device 402 may also obtain and identify non-speech sound which is baby crying sound. The computing device 403 may determine the received voice input to be a partial input. To determine a presence or an absence of a correlation, the computing device 403 may identify a presence of correlation between the received voice input and the baby crying sound because the baby crying sound is associated with the detected recitation of "take care of him." The presence of the correlation may be identified using the predefined correlation matrix. For example, the NLP domain for the voice input may be mapped to the IoT domain. Also, the baby crying sound may also be associated with the IoT domain. Hence, the presence of the correlation may be identified for the received voice input and the baby crying sound. Since the voice input 206 is incomplete and the presence of the correlation is identified, the computing device 403 may generate a response even though the voice input is the partial input. For the given scenario, the response may be "OK, LET ME TAKE CARE OF HIM. I WILL PLAY HIS FAVORITE NURSERY RHYMES 'TWINKLE TWINKLE LITTLE STAR'". Thereafter, the voice assistant device 402 may reproduce a music for a baby in response to a user input of performing an action(function) corresponding to the context of the response which is "I WILL PLAY HIS FAVORITE NURSERY RHYMES 'TWINKLE TWINKLE LITTLE STAR" in the current scenario.

Figure 4D:
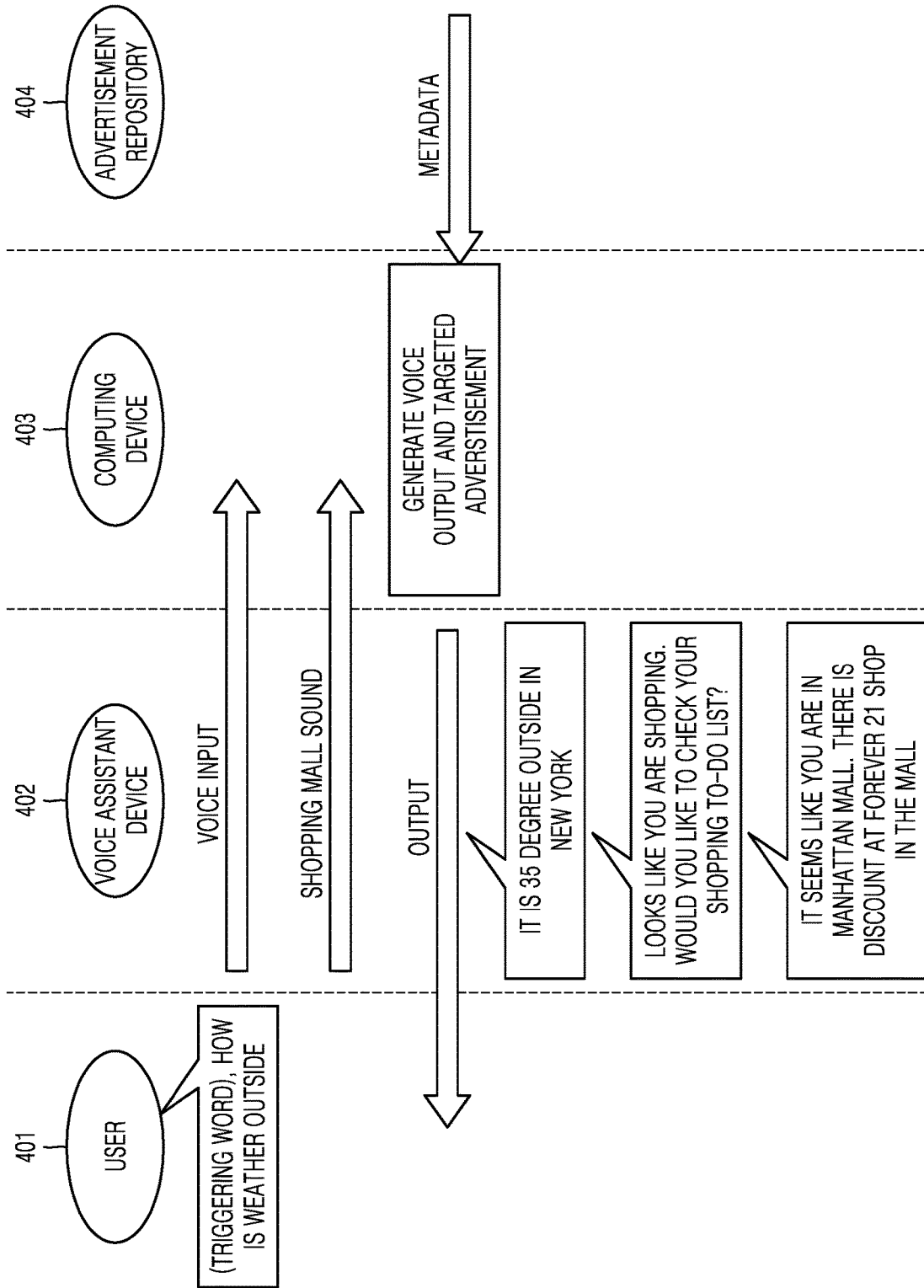
FIG. 4D illustrates a flow diagram representing another exemplary scenario of outputting an intelligent response according to an embodiment of the disclosure.

FIG. 4D illustrates a flow diagram representing another exemplary scenario of outputting an intelligent response according to an embodiment of the disclosure.

Referring to FIG. 4D, the user 401 provides a voice input of "(TRIGGERING WORD), HOW IS WEATHER OUTSIDE" to the voice assistant device 402. The voice input is obtained by the voice assistant device 402 and transmitted to the computing device 403. While obtaining the voice input, the voice assistant device 402 may obtain and identify the non-speech sound to be shopping mall sound. Along with the voice input, the shopping mall sound is also received by the computing device 403. The computing device 403 may determine the received voice input to be a complete input. The computing device 403 may identify an absence of a correlation between the received voice input and the shopping mall sound using the predefined correlation matrix. The NLP domain for the voice input may be mapped to the weather domain. Whereas the shopping mall event corresponding to the shopping mall sound is not associated with the weather domain. Hence, the absence of the correlation may be identified for the received voice input and the shopping mall sound. Since, the voice input is complete and the absence of correlation is identified, the computing device 403 may generate a response and the targeted advertisement content using metadata received from the advertisement repository 404. For the given scenario, the generated response may include "IT IS 35 DEGREES OUTSIDE IN NEW YORK." The computing device 403 may also generate the response including "LOOKS LIKE YOU ARE SHOPPING. WOULD YOU LIKE TO CHECK YOUR SHOPPING TO-DO LIST?" based on the non-speech sound of the shopping mall sound. Based on the location of the voice assistant device 403 detected by a GPS included in the voice assistant device 403 and the identified shopping mall sound, the computing device 403 may determine that the user 401 is in the vicinity of the Manhattan mall in New York. The computing device 403 may search, for example, relevant information for any application associated with the Manhattan mall in New York or search relevant information for databases available via a network. As a result, the targeted advertisement content may include, for example, "IT SEEMS LIKE YOU ARE IN MANHATTAN MALL. THERE IS DISCOUNT AT FOREVER 21 SHOP IN THE MALL". In an embodiment, the discount information or a coupon relevant to the discount information is displayed on the voice assistant device 402 or the computing device 403. In an embodiment, the voice assistant device 402 and the computing device 403 may be combined in one device.

Figure 4E:
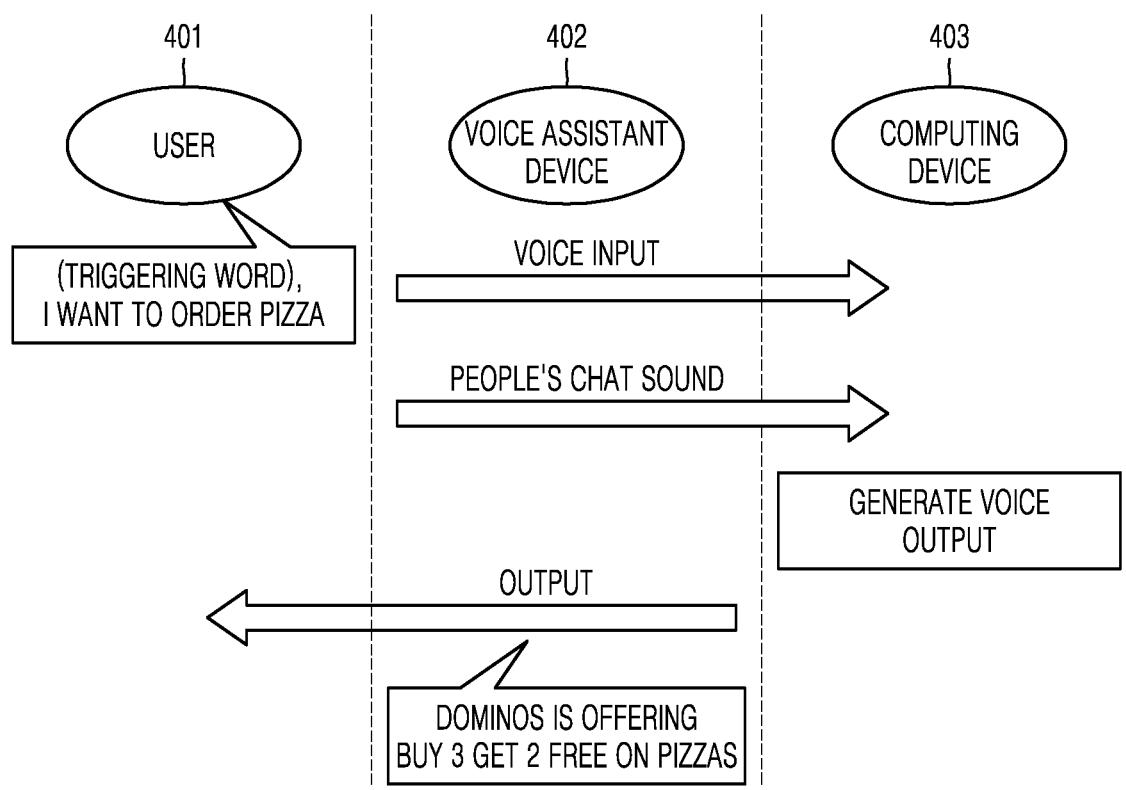
FIG. 4E illustrates a flow diagram representing another exemplary scenario of outputting an intelligent response according to an embodiment of the disclosure.

FIG. 4E illustrates a flow diagram representing another exemplary scenario of outputting an intelligent response according to an embodiment of the disclosure.

Referring to FIG. 4E, the user 401 provides a voice input of "(TRIGGERING WORD), I WANT TO ORDER PIZZA" to the voice assistant device 402. The voice input is obtained by the voice assistant device 402 and transmitted to the computing device 403. While obtaining the voice input, the voice assistant device 402 may obtain and identify non-speech sound to be people's chatting sound. Along with the voice input, the people's chatting sound is also obtained by the computing device 403. The computing device 403 may determine the received voice input to be a complete input. The computing device 403 may determine a presence of correlation between the received voice input and the people's chatting sound. The presence of the correlation may be identified using the predefined correlation matrix. NLP domain for the voice input may be mapped to the booking domain. Since the voice input is complete and the presence of the correlation is identified, the computing device 403 may generate a response and/or the targeted advertisement using metadata received from the advertisement repository 404. For the given scenario, the response may include "SHALL I PLACE AN ORDER FOR PIZZA FROM DOMINOS" and the targeted advertisement content may be "DOMINOS IS OFFERING BUY 3 GET 2 FREE ON PIZZAS". In an embodiment, the targeted advertisement content including an offer of multiple pizzas may be generated based on the people's chatting sound which is loud and analysis thereon indicating a party mood.

The generated response along with the targeted advertisement content may be shared with the voice assistant device 402. In an embodiment, the generated response along with the targeted advertisement content may be provided to the user 401 using the speaker 105 of the voice assistant device 402.

The other data 211 may store data, including temporary data and temporary files, generated by modules for performing the various functions of the computing device 103. The one or more modules 109 may also include other modules 205 to perform various miscellaneous functionalities of the computing device 103. It will be appreciated that such modules may be represented as a single module or a combination of different modules.

Figure 5:
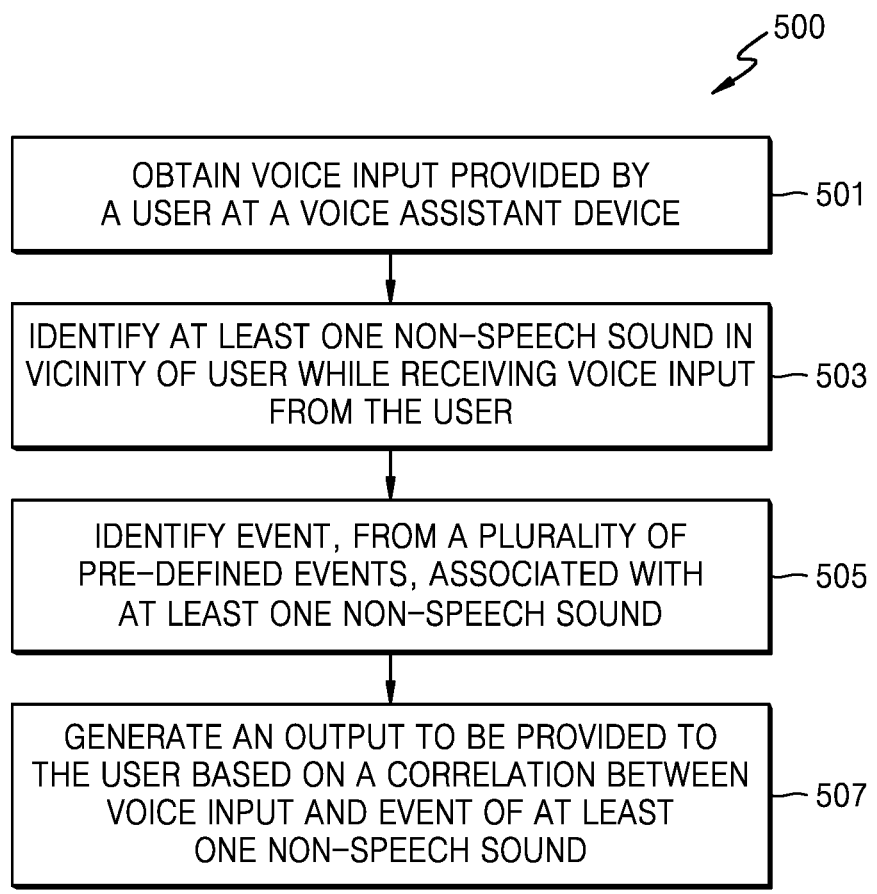
FIG. 5 illustrates a flow diagram of providing an intelligent response by voice assistant device according to an embodiment of the disclosure.

FIG. 5 illustrates a flow diagram of providing an intelligent response by voice assistant device according to an embodiment of the disclosure.

In operation 501, the voice assistant device 101 may obtain a voice input of the user 102. The voice input reception module 201 of the computing device 103 may receive the voice input provided by the user 102 to the voice assistant device 101. In an embodiment, the voice input may be received when the voice assistant device 101 is operated in a wake-up mode. In an embodiment, the received voice input may be determined to be one of a partial input or a complete input to the voice assistant device 101. The processor 106 may identify an intent of the user 102 based on the voice input. For example, based on the natural language processing, the processor 106 may detect the intent of the user—taking care of a baby—when the user 102 provide the voice input of "TAKE CARE OF HIM."

In operation 503, the processor 106 may identify non-speech input including non-speech sound while obtaining the voice input. In an embodiment, and the processor 106 may identify at least one event corresponding to the non-speech sound. The at least one event may be selected from a plurality of pre-defined events which may include an event indicating a presence of a human other than the user 102, a domestic sound event indicating sound occurring inside a building, an outdoor sound event indicating sound occurring outdoor, and an event indicating a mood such as a party mood, a romantic mood, a crowded mood which may be determined based on characteristics of non-speech sound. Further, the processor 106 may map the events with one or more Natural Language Processing (NLP) domains related to the voice assistant device 101 based on a profile of the user 102, to identify the at least one non-speech sound and the corresponding NLP domain capable of handling the at least one non-speech sound.

In operation 505, the processor 106 may identify the event, from the plurality of pre-defined events, associated with the at least one non-speech sound. In an embodiment, the event associated with the at least one non-speech data may be identified based on the profile of the user 102.

In operation 507, the processor 106 may generate a response which is provided to the user 102 through the voice assistant device 101. The response may be generated based on a correlation determined with the voice input and the event corresponding to the at least one non-speech sound. In an embodiment, the processor 106 may determine the correlation between the voice input and the identified event by extracting one or more context parameters from the voice input. The one or more context parameters may be used to identify an NLP domain capable of handling the voice input. Further, the processor 106 may map the event with the NLP domain identified for the voice input using the pre-defined correlation matrix, to perform the correlation. In an embodiment, the processor 106 may determine the correlation based on the intent of the user and the non-speech sound. In an embodiment, the pre-defined correlation matrix indicates a correlation between the plurality of pre-defined events related to a plurality of non-speech sound and one or more NLP domains related to the voice assistant device 101. The pre-defined correlation matrix may be generated based on at least one of a profile of the user 102, a location of the voice assistant device 101, and a type of devices connected to the voice assistant device 101.

In an embodiment, for generating the response, when the voice input from the user 102 is one of a partial input or a complete input, the processor 106 may identify a presence of a correlation between the voice input and the event corresponding to the at least one non-speech sound. In response to the identification of the presence of the correlation, the processor 106 may generate a response based on the correlation between the voice input and the identified event. In an embodiment, the response may optionally include targeted advertisement content related to the at least one non-speech sound.

In an embodiment, for generating the response, when the voice input from the user 102 is a complete input, the processor 106 may identify an absence of a correlation between the voice input and the event corresponding to the at least one non-speech sound. In response to the identification of the absence of the correlation, the processor 106 may generate targeted advertisement content related to the at least one non-speech sound along with a response related to the voice input. In an embodiment, the targeted advertisement content may be generated based on a profile of the user 102 and metadata received from advertisement repository for the at least one non-speech sound.

In an embodiment, the response or the targeted advertisement content may include an action related to the correlation, a suggestion related to the correlation, and/or a recommendation related to the correlation. In an embodiment, the suggestion or the recommendation may include a suggestion of launching at least one application installed in the voice assistant device 101 or the computing device 103. The suggestion may include an advertisement content related to the non-speech sound and may be generated based on data included or generated in the at least one application. The advertisement content may be generated based on a profile of the user and metadata received from a database.

As illustrated in FIG. 5, the method 500 may include one or more operations for executing processes in the voice assistant device 101 and the computing device 103. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor 106 may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing an intelligent response, the method comprising:
   obtaining, by a voice assistant device, a voice input comprising a speech signal of a user;
   identifying non-speech input from the obtained speech signal of the user;
   identifying an intent of the user based on the voice input;
   determining, using a predefined correlation matrix, a correlation between the voice input and the non-speech input based on the intent of the user and the non-speech input; and
   generating, based on the correlation, a response to the voice input based on the correlation.

2. The method of claim 1, further comprising:
   mapping the non-speech input into at least one event occurring in an ambience of the user.

3. The method of claim 2, wherein the at least one event comprises at least one of an event indicating a presence of a human other than the user, a domestic sound event, an outdoor sound event, or an event indicating a mood.

4. The method of claim 2, further comprising identifying the at least one event based on a profile of the user.

5. The method of claim 2, wherein the determining the correlation comprises:
   extracting one or more context parameters from the voice input, wherein the one or more context parameters is used to identify a natural language processing (NLP) domain capable of handling the voice input; and
   mapping the at least one event to the NLP domain using the predefined correlation matrix.

6. The method of claim 5, wherein the predefined correlation matrix represents correlations between a plurality of predefined events related to a plurality of non-speech inputs and NLP domains related to the voice assistant device.

7. The method of claim 5, wherein the predefined correlation matrix is generated based on at least one of a profile of the user, a location of the voice assistant device, and a type of devices connected to the voice assistant device.

8. The method of claim 1, wherein the response comprises a natural language response.

9. The method of claim 1, wherein the response comprises a suggestion of launching at least one application installed in a device of the user.

10. The method of claim 9, wherein the at least one application comprises a booking application related to the correlation.

11. The method of claim 9, wherein the suggestion is generated based on data included in the at least one application or generated in the at least one application.

12. The method of claim 1, wherein suggestion comprises an advertisement content related to the non-speech input.

13. The method of claim 12, wherein the advertisement content is generated based on a profile of the user and metadata received from a database.

14. An apparatus of providing an intelligent response, the apparatus comprising:
   a receiver which obtains a voice input comprising a speech signal of a user;
   a processor configured to identify non-speech input from the obtained speech signal of the user, identify an intent of the user based on the voice input, determine, using a predefined correlation matrix, a correlation between the voice input and the non-speech input based on the intent of the user and the non-speech input, and generate are response to the voice input based on the correlation.

15. The apparatus of claim 14, wherein the processor is configured to map the non-speech input into at least one event occurring in an ambience of the user.

16. The apparatus of claim 15, wherein the processor is configured to determine the correlation based on extracting one or more context parameters from the voice input, wherein the one or more context parameters is used to identify a natural language processing (NLP) domain capable of handling the voice input and mapping the at least one event to the NLP domain using the predefined correlation matrix.

17. The apparatus of claim 16, wherein the predefined correlation matrix represents correlations between a plurality of predefined events related to a plurality of non-speech inputs and NLP domains related to the apparatus.

18. The apparatus of claim 16, wherein the predefined correlation matrix is generated based on at least one a profile of the user, a location of the apparatus, and a type of devices connected to the apparatus.

19. A non-transitory computer readable storage medium having a computer readable instructions stored therein, when executed by at least one processor, the at least one processor controls to perform a method for providing an intelligent response, the method comprising:

obtaining, by a voice assistant device, a voice input comprising a speech signal of a user;

identifying non-speech input from the obtained speech signal of the user;

identifying an intent of the user based on the voice input;

determining, using a predefined correlation matrix, a correlation between the voice input and the non-speech input based on the intent of the user and the non-speech input; and generating, based on the correlation, a response to the voice input based on the correlation.

* * * * *